3,279,891
**APPARATUS FOR PRODUCTION OF FINE-CRYS-
TALLINE BORON PHOSPHIDE**
Fritz Wenzel, Nurnberg, Germany, assignor to Siemens-
Schuckertwerke Aktiengesellschaft, Berlin-Siemensstadt
and Erlangen, Germany, a corporation of Germany
Filed July 2, 1963, Ser. No. 292,393
Claims priority, application Germany, July 13, 1962,
S 80,385
8 Claims. (Cl. 23—277)

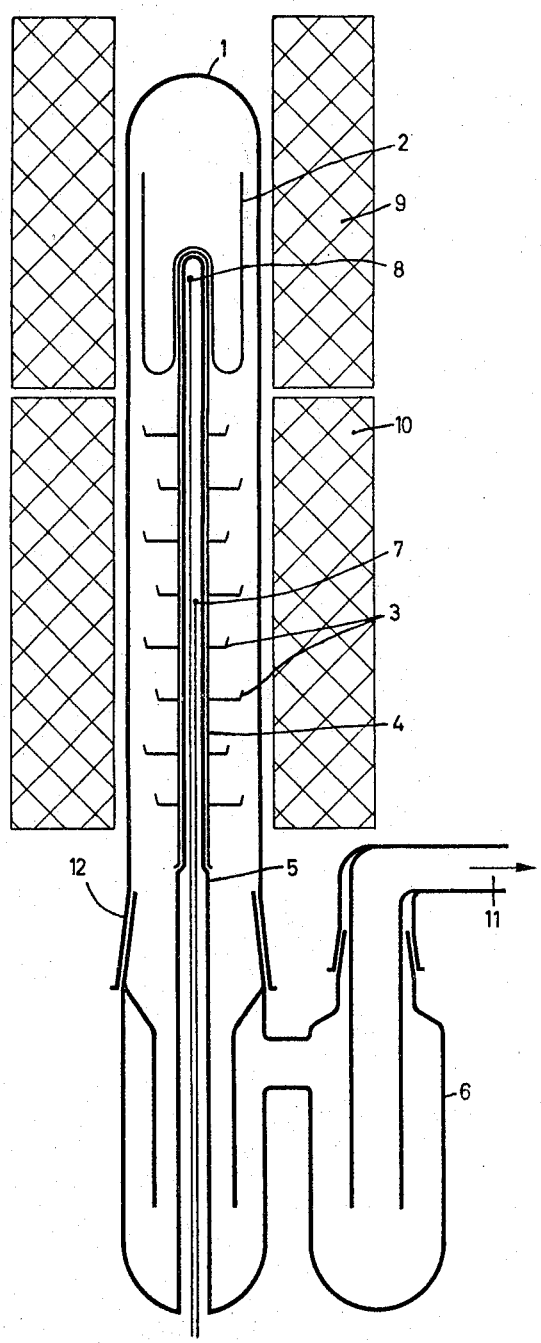

My invention relates to an apparatus for producing fine-crystalline boron phosphide.

A process for manufacturing boron phosphide is known in which the reaction of elemental boron with gaseous phosphorus takes place at a temperature of about 1000° C. In accordance with another known process, elemental amorphous boron is permitted to react with phosphorus vapor at 1000° C. in a phial, the phosphorus vapor being supplied by $CoP_3$, the source of phosphorus (U.S. Patent No. 3,021,196). It has furthermore been suggested to use fine-crystalline boron phosphide as starting material for the production of boron phosphide monocrystals in the copending application Serial No. 266,736, filed March 20, 1963, and entitled "Method of Producing Crystalline Boron Phosphide," of which I am a co-inventor.

It is an object of my invention to provide an apparatus that produces fine-crystalline boron phosphide in large batches and in an operation of short duration.

It is another object of my invention to provide an apparatus for producing fine-crystalline boron phosphide in which the reaction of a predetermined amount of boron takes place in a reactor portion of the apparatus over a large surface area and thereby the entire duration of the reaction is substantially promoted and accelerated.

It is a further object of my invention to provide an apparatus for producing fine-crystalline boron phosphide in which no elements other than boron and phosphorus are necessary to carry out the reaction.

In accordance with my invention, I provide an apparatus for producing fine-crystalline boron phosphide from elemental amorphous or crystalline boron and phosphorus vapor. The apparatus comprises a supply container for solid phosphorus from which phosphorus vapor is produced, the container being carried by a support in a vertically disposed reaction pipe which is closed at its upper end. At least one supply container for boron which is necessary for the reaction is also mounted on the support.

According to another feature of my invention, a cooling system is provided at the lower end of the reaction pipe.

According to an additional feature of my invention, the reaction pipe and the supply containers are made of material that is resistant to phosphorus vapor at high temperatures and the entire reaction pipe is heatable except for a portion in the vicinity of the cooling system.

The foregoing and other objects, advantages and features of my invention will be apparent from the preferred embodiment of an apparatus embodying my invention schematically illustrated by way of example in the accompanying drawing in conjunction with the following detailed description.

The apparatus comprises an outer reaction tube 1 which encloses a cup-shaped container 2 for phosphorus or a phosphorus compound and for a suitable reducing agent which will react with the compound when heated to produce phosphorus vapor. Also mounted in the tube 1 are a number of shallow containers 3 for boron. All of the containers 2, 3 are fastened on a tubular support 4. A pipe 5 extends within and along the tubular support 4 for protection of temperature responsive sensors such as thermocouples 7 and 8. A cooling system 6 is located at the lower end of the reaction tube 1. A heating coil assembly 9, 10 surrounds the reaction tube 1 down to the cooling system.

The tube 1 is closed at the top end. The supply containers 3 are disposed in staggered relation to one another and in tier arrangement. They are either removably or permanently secured to the support 4. The tubular support 4 surrounds the thermocouple protective pipe 5 which extends into the tubular support 4 through the open end thereof. The thermocouple protective pipe 5 is connected as by soldering or welding at its lower end to the suitably apertured base of a cooling trap forming part of the cooling system 6 in the manner shown in the drawing so that the leads from the thermocouple 8, which responds to the temperature of the phosphorus or mixture of phosphorus compound and reducing agent, and of the thermocouple 7, which responds to the temperature of the boron supply, can be withdrawn therefrom. The lower portion of the protective pipe 5 is widened and thus forms a shoulder which supports the tubular support 4. The lower portion of the reaction tube forms a phosphorus vapor-tight connection at 12, such as by press fitting, with the inlet end of a double cooling trap of the cooling system. The apparatus can be connected at 11 through a system of wash bottles (not shown), to an exhaust duct or to a closure balloon or carboy.

The materials used in the construction of the apparatus should be highly resistant to phosphorus vapors at the occurring high temperatures. Among such suitable materials are, for example quartz, aluminum oxide (sintered alumina), or other ceramic substances, which may also be coated with a protective layer of boron phosphide.

The apparatus according to the invention is heatable along its entire length except for a portion adjoining the cooling system. The phosphorus and the boron supplies are heated by the heating coils 9 and 10 with the help of non-illustrated regulating devices. Examples of other suitable heating means are electric resistance furnaces, high-frequency heating furnaces, and gas furnaces.

The phosphorus container 2 is preferably installed above the boron containers 3 as shown. Due to this arrangement, the boron supply which is distributed over the entire length of the reaction tube, presents a large surface for the formation of boron phosphide to the phosphorus vapor which becomes coated thereon. Negative pressure at the inlet end 11 of the apparatus ensures a continuous flow of phosphorus vapor through the equipment.

Elemental red or white phosphorus can be used as the phosphorus vapor source. Also applicable are phosphorus compounds capable of issuing vaporous phosphorus, for example $CoP_2$ or phosphorus compounds from which phosphorus can be liberated by reaction with a reducing agent, for example phosphate ores.

The boron to be used in the reaction may be amorphous or crystalline, though preferably of finely divided form.

The phosphorus vapor is preferably maintained at a pressure under which the reaction takes place rapidly and only a small portion of the phosphorus vapor does not take part in the reaction and condenses in the cooling system of the apparatus. A phosphorus vapor pressure greater than 0.2 of an atmosphere is preferable. The reaction temperature is above 500° C., preferably between 1000 and 1400° C. The duration of the reaction may vary between several minutes and several hours.

An operating example will now be described.

An amount of 125 grams red phosphorus is placed in container 2, and a total of 20 grams amorphous boron in the container 3. The apparatus, made of quartz, is rinsed with argon and is closed at 11 with a carboy or balloon filled with argon. A washing assembly between the closure and the apparatus proper contains sulphuric acid and copper sulphate solution. The phosphorus supply is heated by an electric heater or furnace to about 400° C., which corresponds to about 0.7 atmosphere. The boron supply is heated to about 1100° C. After 6 hours the heaters are turned off to permit them to cool. The apparatus is opened and the boron phosphide is removed. The yield amounts to 55 grams of boron phosphide as against a computed yield of 76 grams, which is approximately 73% of the theoretical maximum.

Upon a study of my disclosure it will be obvious to those skilled in the art that my invention permits of various modifications with respect to design and arrangement of components and may be embodied in apparatuses other than particularly illustrated and described, without departing from the essential features of my invention and within the scope of the claims annexed hereto.

I claim:

1. An apparatus for producing fine-crystalline boron phosphide from elemental boron and phosphorus vapor, comprising upright elongated reaction chamber means having a closed upper end and an open lower end; support means provided in said chamber means; first container means for containing boron and second container means for containing a phosphorus-vapor producing substance mounted on said support means, said first container means comprising a plurality of shallow supply containers for boron adapted to afford a maximum reactive surface area for the boron, said second container means being located above said first container means, both said first and second container means and said support means consisting of material resistant to phosphorus vapor at high temperatures; heating means above the lower end of said chamber means for heating said chamber means to a temperature at which phosphorus vapor is produced from a phosphorus-vapor producing substance contained in said second container means; and cooling means connected to the lower open end of said chamber means below said heating means.

2. An apparatus for producing fine-crystalline boron phosphide from elemental boron and phosphorus vapor, comprising an upright elongated tubular reaction vessel having a closed upper end and an open lower end; an elongated support vertically mounted in said vessel; first container means for containing boron and second container means for containing a phosphorus-vapor producing substance mounted on said support, said second container means being located above said first container means, said first container means comprising a plurality of shallow boron supply containers adapted to afford a maximum reactive surface area for the boron and mounted in tiers and in staggered relation to each other along said support; heating means above the lower end of said vessel for heating said second container means in said vessel to a temperature at which phosphorus vapor is produced from the substance contained in said second container means; and cooling means connected to the lower open end of said chamber means below said heating means.

3. In apparatus for producing fine-crystalline boron phosphide from elemental boron and phosphorus vapor according to claim 1, said cooling means comprising a double cooling trap connected to said lower open end of said vessel below said heating means.

4. An apparatus for producing fine-crystalline boron phosphide from elemental boron and phosphorus vapor, comprising elongated reaction chamber means having a closed upper end and an open lower end; an elongated tubular support mounted in said chamber means; container means for containing a phosphorus-vapor producing substance and boron carried by said support, said container means for the boron comprising a plurality of shallow boron supply containers adapted to afford a maximum reactive surface area for the boron and mounted in tiers and in staggered relation to each other along said support, said container means and said support consisting of material resistant to phosphorus vapor at high temperatures; heating means above the lower end of said chamber means for heating said chamber means to a temperature at which phosphorus vapor is produced from a phosphorus-vapor producing substance contained in said container means; cooling means comprising a double cooling trap connected to the lower open end of said chamber means below said heating means; protective tube means received in said tubular support and secured at one end to a base of said double cooling trap; and temperature responsive sensors extending into said protective tube means for sensing the temperatures of the phosphorus vapor producing substance and of the boron.

5. In an apparatus for producing fine-crystalline boron phosphide according to claim 1, wherein said support and said containers consist of material resistant to phosphorus vapor at temperatures up to 1400° C.; and including an exhaust duct communicating with said chamber means through said cooling means.

6. An apparatus for producing fine-crystalline boron phosphide according to claim 1, wherein said first and second container means are removably mounted on said support structure.

7. Apparatus according to claim 2, wherein said elongated support is tubular and consists of quartz.

8. Apparatus according to claim 2, wherein said elongated support is tubular and consists of sintered alumina.

References Cited by the Examiner

UNITED STATES PATENTS 2,482,127   9/1949   Schlechten et al. ___ 23—264 XR

OTHER REFERENCES

Popper and Ingles: "Nature," Macmillan Ltd., 1957 (page 1075 relied on).

MORRIS O. WOLK, *Primary Examiner.*

JAMES H. TAYMAN, JR., *Examiner.*